United States Patent
Okamoto et al.

(10) Patent No.: US 7,014,921 B2
(45) Date of Patent: Mar. 21, 2006

(54) AROMATIC LIQUID-CRYSTALLINE POLYESTER

(75) Inventors: Satoshi Okamoto, Tsukuba (JP); Tomoya Hosoda, Tsukuba (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 0 days.

(21) Appl. No.: 10/979,120

(22) Filed: Nov. 3, 2004

(65) Prior Publication Data

US 2005/0113555 A1    May 26, 2005

(30) Foreign Application Priority Data

Nov. 5, 2003  (JP) .............................. 2003-375295
Feb. 27, 2004 (JP) .............................. 2004-053330

(51) Int. Cl.
*B32B 27/06* (2006.01)
*C08G 63/18* (2006.01)

(52) U.S. Cl. ................. 428/480; 528/176; 528/190; 528/193; 528/194; 528/206; 524/401; 428/458

(58) Field of Classification Search ........... 528/176, 528/190, 193, 194, 206; 524/401; 428/458, 428/480
See application file for complete search history.

(56) References Cited

U.S. PATENT DOCUMENTS 5,962,122 A * 10/1999 Walpita et al. .............. 428/325
6,815,526 B1 * 11/2004 Yokota et al. ............... 528/272
2004/0152865 A1    8/2004 Okamoto et al.

FOREIGN PATENT DOCUMENTS

EP    0 672 721    *  9/1995
JP    08-143654 A    6/1996

* cited by examiner

*Primary Examiner*—Samuel A. Acquah
(74) *Attorney, Agent, or Firm*—Sughrue Mion, PLLC

(57) ABSTRACT

An aromatic liquid-crystalline polyester with good moldability into a film is provided. The resulting film has small dielectric loss. The polyester comprises repeating units represented by formulae (I), (II), (III) and (IV), and the molar amounts of repeating units (I)–(IV) are 40–74.8%, 12.5–30%, 12.5–30% and 0.2–15%, respectively, wherein the molecular amounts of repeating units (III) and (IV) satisfy the relation of $(III)/[(III)+(IV)] \geq 0.5$.

6 Claims, No Drawings

AROMATIC LIQUID-CRYSTALLINE POLYESTER

BACKGROUND OF THE INVENTION

1. Field of the Invention

The invention relates to an aromatic liquid-crystalline polyester and a film obtained therefrom.

2. Description of the Related Art

An aromatic liquid-crystalline polyester having phenylene groups as its main repeating units has been known. For example, an aromatic liquid-crystalline polyester having 60% by mole of repeating units derived from parahydroxybenzoic acid and 20% by mole of repeating units derived from isophthalic acid has been proposed as the aromatic liquid-crystalline polyester having phenylene groups as its main repeating units and having small dielectric loss (see, Japanese Patent Application Laid-Open No. 2002-359145).

Also, a film obtained by molding such an aromatic liquid-crystalline polyester in a solvent-casting method has been known and utilized in the electrical and electronic fields.

However, while the conventional aromatic liquid-crystalline polyester having phenylene groups as its main repeating units can be molded by a solvent-casting method, it is difficult to mold the polyester into a film by an injection method or a tubular method.

SUMMARY OF THE INVENTION

Accordingly, one of objects of the present invention is to provide an aromatic liquid-crystalline polyester film excellent in moldability (processability) into a film while maintaining small dielectric loss.

The inventors of the invention have conducted intensive studies and have achieved the above object and other objects by finding an aromatic liquid-crystalline polyester comprising repeating units derived from hydroxynaphthalenecarboxylic acid, naphthalene-dicarboxylic acid, terephthalic acid and the like. The present invention has been accomplished based on the findings.

The present invention provides an aromatic liquid-crystalline polyester comprising repeating units represented by the following formulae (I), (II), (III) and (IV):

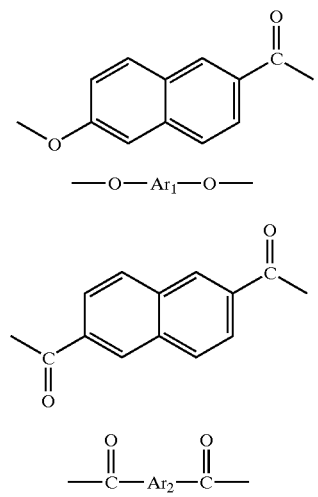

$Ar_1$ and $Ar_2$ independently representing 1,4-phenylene or 4,4'-biphenylene, and the amount of repeating unit (I) being in the range of from 40% by mole to 74.8% by mole;
the amount of repeating unit (II) being in the range of from 12.5% by mole to 30% by mole;
the amount of repeating unit (III) being in the range of from 12.5% by mole to 30% by mole; and
the amount of repeating unit (IV) being in the range of from 0.2% by mole to 15% by mole, each molecular amount ratio being relative to the sum of the molecular amounts of repeating units (I) to (IV), wherein the molecular amounts of repeating units (III) and (IV) satisfy the relation of $(III)/[(III)+(IV)] \geq 0.5$.

The invention also provides an aromatic liquid-crystalline polyester film obtained by melt-molding the above-described aromatic liquid-crystalline polyester.

Further, the invention provides a laminate comprising a metal layer and a layer comprising the above-described aromatic liquid-crystalline polyester film.

Moreover, the invention provides an aromatic liquid-crystalline polyester resin composition comprising 100 parts by weight of the above-described aromatic liquid-crystalline polyester and a filler in the amount of from 0.1 part by weight to 400 parts by weight.

In addition, the invention provides a molded article obtained by molding a composition comprising the above-described aromatic liquid-crystalline polyester.

The aromatic liquid-crystalline polyester of the present invention has small dielectric loss and is excellent in moldability (processability) into a film.

DESCRIPTION OF THE PREFERRED EMBODIMENTS

An aromatic liquid-crystalline polyester of the invention comprises repeating units represented by the following formulae (I), (II), (III) and (IV):

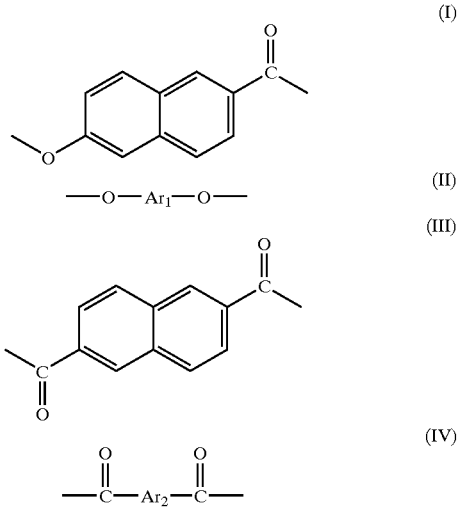

wherein $Ar_1$ and $Ar_2$ independently represent 1,4-phenylene or 4,4'-biphenylene. In the aromatic liquid-crystalline polyester:

the amount of repeating unit (I) is in the range of from 40% by mole to 74.8% by mole;

the amount of repeating unit (II) is in the range of from 12.5% by mole to 30% by mole;

the amount of repeating unit (III) is in the range of from 12.5% by mole to 30% by mole; and the amount of repeating unit (IV) is in the range of from 0.2% by mole to 15% by mole, each molecular amount ratio being relative to the sum of molecular amounts of the repeating units (I) to (IV), wherein the molecular amounts of repeating units (III) and (IV) satisfy the relation of (III)/[(III)+(IV)]≧0.5.

Preferably, in the aromatic liquid-crystalline polyester of the present invention, the amount of repeating unit (I) is in the range of from 40% by mole to 64.5% by mole, the amount of repeating unit (II) is in the range of from 17.5% by mole to 30% by mole, the amount of repeating unit (III) is in the range of from 17.5% by mole to 30% by mole, and the amount of repeating unit (IV) is in the range of from 0.5% by mole to 12% by mole, each molecular amount ratio being relative to the sum of the molecular amounts of repeating units (I) to (IV), wherein the molecular amounts of repeating units (III) and (IV) satisfy the relation of (III)/[(III)+(IV)]≧0.6.

More preferably, in the aromatic liquid-crystalline polyester of the present invention, the amount of repeating unit (I) is in the range of from 50% by mole to 58% by mole, the amount of repeating unit (II) is in the range of from 20% by mole to 25% by mole, the amount of repeating unit (III) is in the range of from 20% by mole to 25% by mole, and the amount of repeating unit (IV) is in the range of from 2% by mole to 10% by mole, each molecular amount ratio being relative to the sum of the molecular amounts of repeating units (I) to (IV), wherein the molecular amounts of repeating units (III) and (IV) satisfy the relation of (III)/[(III)+(IV)]≧0.6.

When the amount of repeating unit (I) is less than 40% by mole in the aromatic liquid-crystalline polyester, the polyester may be difficult to exhibit optical anisotropy in melting. When the amount of repeating unit (I) is more than 74.8% by mole in the aromatic liquid-crystalline polyester, the polyester tends to have a high viscosity in melting, which may result in lowered processability. When the amount of repeating unit (II) or (III) is more than 30% by mole in the aromatic liquid-crystalline polyester, the polyester may be difficult to exhibit optical anisotropy in melting. When the amount of repeating unit (II) or (III) is less than 12.5% by mole in the aromatic liquid-crystalline polyester, the polyester tends to have a high viscosity in melting, which may result in lowered processability. In addition, when the amount of repeating unit (IV) is more than 12% by mole, or less than 0.5% by mole, or when the value of (III)/[(III)+(IV)] is less than 0.5 in the aromatic liquid-crystalline polyester, then the polyester tends to be difficult to have a small dielectric loss.

Examples of compounds for providing the repeating unit (I) include 2-hydroxy-6-naphthoic acid and its derivatives which can be converted into ester compounds.

As mentioned above, $Ar_1$ in repeating unit (II) represents 1,4-phenylene or 4,4'-biphenylene. Examples of compounds for providing the repeating unit (II) include an aromatic diol such as hydroquinone, and 4,4'-dihydroxybiphenyl, and its derivatives which can be converted into ester compounds.

Examples of the derivatives of aromatic diols which can be converted into ester compounds include the esters with carboxylic acids, which can generate polyesters by ester exchange reactions.

Among the compounds for the repeating unit (II), hydroquinone and 4,4'-dihydroxybiphenyl are preferred, since heat resistance of the resulting aromatic liquid-crystalline polyester is enhanced.

Examples of compounds for providing the repeating unit (III) include an aromatic dicarboxylic acid such as 2,6-naphthalene dicarboxylic acid and its derivatives which can be converted into ester compounds.

In addition, as mentioned above, $Ar_2$ in repeating unit (IV) represents 1,4-phenylene or 4,4'-biphenylene. Examples of compounds for providing the repeating unit (IV) include an aromatic dicarboxylic acid such as terephthalic acid and 4,4'-biphenyl dicarboxylic acid, and its derivatives which can be converted into ester compounds.

Among the compounds for the repeating unit (IV), terephthalic acid is preferred, since heat resistance of the resulting aromatic liquid-crystalline polyester is enhanced, and also melt tension of the polyester in the molten state during molding into a film is improved, which provides excellent moldability of the polyester.

Examples of the above-mentioned derivatives of aromatic dicarboxylic acids which can be converted into ester compounds include derivatives such as chlorides and anhydrides of aromatic dicarboxylic acids, that are highly reactive derivatives which can accelerate a reaction for generating polyesters; and esters of alcohols or ethyleneglycol, which are derivatives that can generate polyesters by ester exchange reactions.

The above-described compounds for providing repeating units (I)–(IV) may be used alone or as a combination of at least two of them, for each of the repeating units.

Using such compounds, an aromatic liquid-crystalline polyester in the present invention may be produced as described below.

The molar ratio between the aromatic dicarboxylic acid (for repeating units (III) and (IV)) and aromatic diol (for repeating unit (II)) as raw materials (compounds) for providing the aromatic liquid-crystalline polyester of the present invention is preferably in the range of 85/100 to 100/85. This range of the molar ratio is preferable, since the degree of polymerization of the resulting aromatic liquid-crystalline polyester can be high, which results in improving mechanical strength of the molded article obtained from the aromatic liquid-crystalline polyester.

In producing the aromatic liquid-crystalline polyester in the present invention, acylated compounds of 2-hydroxy-6-naphthoic acid and aromatic diol are preferably used as the raw materials. The acylated compounds can be obtained by subjecting phenolic hydroxyl groups of 2-hydroxy-6-naphthoic acid and aromatic diol to acylation with a fatty acid anhydride.

Examples of the fatty acid anhydride include acetic anhydride, propionic anhydrides, butyric anhydride, isobutyric anhydride, valeric anhydride, pivalic anhydride, 2-ethyihexanoate anhydride, monochioroacetyl anhydride, dichloroacetyl anhydride, trichloroacetyl anhydride, monobromoacetyl anhydride, dibromoacetyl anhydride, tribromoacetyl anhydride, monofluoroacetyl anhydride, difluoroacetyl anhydride, trifluoroacetyl anhydride, glutaric anhydride, maleic anhydride, succinic anhydride and β-bromopropionic anhydride. These anhydride may be used alone, or as a mixture of at least two of them.

Acetic anhydride, propionic anhydride, butyric anhydride and isobutyric anhydride are preferably used from the view point of their costs and handling performance, and acetic anhydride is more preferably used.

The equivalent ratio of the fatty acid anhydride to be used relative to phenolic hydroxyl groups of 2-hydroxy-6-naphthoic acid and aromatic diol may be 1 to 1.2.

The equivalent ratio is preferably 1 to 1.05 and is more preferably 1.03 to 1.05 in order to suppress the generation of gas when the polyester is molded into the article. From the view point of impact resistance of the resulting molded article, the equivalent ratio is preferably 1.05 to 1.17 and is more preferably 1.05 to 1.15.

Although not outside the scope of the present invention, when the equivalent ratio of the fatty acid anhydride to be used relative to phenolic hydroxyl groups of 2-hydroxy-6-naphthoic acid and aromatic diol is less than 1, then acylation of 2-hydroxy-6-naphthoic acid and aromatic diols may be insufficient, and non-acylated 2-hydroxy-6-naphthoic acid and aromatic diols may sublime in polymerization reaction thereof to the polyester, which can cause clogging of the polymerization reaction system. Also again while not outside the scope of the present invention, when the equivalent ratio exceeds 1.2, then the resulting aromatic liquid-crystalline polyester tends to be colored.

The acylation reaction is preferably carried out at a temperature of from 130° C. to 180° C. for 30 minutes to 20 hours, more preferably at a temperature of from 140° C. to 160° C. for 1 hour to 5 hours. The acylation may be conducted by the methods described in Japanese Patent Application Laid-Open Nos. 2002-220444 and 2002-146003 (corresponding to U.S. patent application Laid-Open No.2002-143135 and U.S. Pat. No. 6,512,079, respectively).

An aromatic liquid-crystalline polyester in the present invention may be obtained by ester-exchange (polycondensation) reaction between:

the acyl groups of the above-described acylated compounds of 2-hydroxy-6-naphthoic acid and aromatic diol; and the carboxylic groups of the acylated compounds of 2-hydroxy-6-naphthoic acid, 2,6-naphthalene dicarboxylic acid, an aromatic carboxylic acid and 2-hydroxy-6-naphthoic acid.

Such an ester-exchange reaction can be carried out as described below.

The ester exchange (polycondensation) reaction is preferably carried out at a temperature of from 130° C. to 330° C. while heating at a heating rate of 0.1° C./minutes to 50° C./minute, and is more preferably carried out at a temperature of from 150° C. to 320° C. while a heating at a heating rate of 0.3° C./minute to 5° C./minute. When the reaction temperature is higher than 330° C., then the resulting product, prepolymer, (that is one of aromatic liquid-crystalline polyesters with a low polymerization degree and is a product obtained from the ester exchange reaction) tends to have a higher melt viscosity and a higher melting point, which results in that all amounts of the prepolymer is difficult to be discharged from the reactor of the ester exchange reaction.

When the ester-exchange reaction is conducted, it is preferred to remove the fatty acids as by-products and the unreacted fatty acid anhydrides out of the reaction system by distillation in order to shift the reaction equilibrium to the polyester production side. The starting materials evaporated or sublimated by being accompanied with the fatty acid may be recovered into the reactor by condensation or inverse sublimation, when a portion of the distilled fatty acid is retrieved to the reactor by refluxing. It is also possible to retrieve the precipitated carboxylic acid to the reactor together with the fatty acid.

The acylation reaction and ester exchange reaction may be carried out in the presence of a catalyst. Catalysts conventionally known as polymerization catalysts for producing polyesters may be used. Examples of the catalyst include metal salt catalysts such as magnesium acetate, tin (II) acetate, tetrabutyl titanate, lead acetate, sodium acetate, potassium acetate and antimony trioxide; and organic compound catalysts such as N,N-dimethylamino pyridine and 1-methyl imidazole.

The catalyst may be added to the monomers for acylation when the monomers are subjected to the acylation reaction, and does not always need to be removed after the acylation reaction. The ester exchange reaction may be directly carried out without removing the catalyst.

Heterocyclic organic base compounds containing at least two nitrogen atoms, such as N,N-dimethylaminopyridine and 1-methylimidazole, are preferably used among these catalysts.

For example, an aromatic liquid-crystalline polyester may be obtained using the heterocyclic compound having at least two nitrogen atoms by the method described in Japanese patent Application Laid-Open No. 2002-146003 (corresponding to U.S. Pat. No. 6,512,079).

In order to obtain a prepolymer for providing an aromatic liquid-crystalline polyester in the present invention, a melt condensation polymerization is preferably performed by a batch-wise polymerization method from the view point of improving productivity.

The prepolymer obtained by melt condensation polymerization is preferably subjected to solid phase polymerization to obtain the aromatic liquid-crystalline polyester with high degree of polymerization. The prepolymer may be granulated into a powder and then heated for solid phase polymerization. The degree of polymerization of the resulting aromatic liquid-crystalline polyester can be increased by the heating, since the polymerization of the aromatic liquid-crystalline polyester can proceed in the fine powder state while heating.

For preparing the powder of the prepolymer obtained by melt condensation polymerization, the prepolymer may be pulverized after being solidified by cooling. The particle diameter of the powder is preferably in the range of not smaller than 0.05 mm and not larger than 3 mm. From the viewpoint of high degree of polymerization of the aromatic liquid-crystalline polyester, the particle diameter of the powder is more preferably in the range of not smaller than 0.05 mm and not larger than 1.5 mm. From the viewpoint of suppressing sintering between the powder particles, which provides a higher degree of polymerization of the aromatic liquid-crystalline polyester, the particle diameter of the powder is most preferably in the range of not smaller than 0.1 mm and not larger than 1 mm.

After the melt condensation polymerization and the optional pulverization to obtain the above-described prepolymer, solid phase polymerization reaction may be conducted to prepare the aromatic liquid-crystalline polyester with a higher degree of polymerization from the prepolymer.

The solid phase polymerization reaction is preferably carried out, while the reaction temperature is continuously increased by heating. For example, the temperature is increased from a room temperature (about 25° C.) to a temperature lower by at least 20° C. than the flow-initiating temperature of the prepolymer. The heating time is not particularly limited, and is preferably within 1 hour from the viewpoint of shortening the reaction time.

In the solid phase polymerization reaction, the reaction temperature is preferably increased from a temperature lower by at least 20° C. than the flow-initiating temperature of the prepolymer to a temperature of not lower than 300° C. with a heating rate of not higher than 0.3° C./minute. The heating rate is more preferably in the range of from 0.1° C./minute to 0.15° C./minute. The heating rate of not higher than 0.3° C./minute is preferable, since sintering hardly occurs between the powder particles, which results in easily producing the aromatic liquid-crystalline polyester with high degree of polymerization thereof.

As described above, the reaction temperature for the solid phase polymerization reaction is preferably increased from a temperature lower by at least 20° C. than the flow-initiating temperature of the prepolymer to a temperature of not lower than 300° C. It is preferred to allow the prepolymer to react at a temperature of not lower than 300° C., more preferably at a temperature in the range of from 300° C. to 400° C., for at least 30 minutes in order to enhance the degree of polymerization of the resulting aromatic liquid-crystalline polymer, while the optimal conditions vary depending on the monomers for providing the repeating units of the resulting aromatic liquid-crystalline polyester.

Especially, from the viewpoint of thermal stability of the polyester, the reaction is more preferably conducted in the range of from 300° C. to 350° C. for 30 minutes to 30 hours, and most preferably in the range of from 300° C. to 340° C. for 30 minutes to 20 hours.

The flow-initiating temperature of a polyester in the present invention can be defined as a temperature at which the polyester has a melt viscosity of 4,800 Pa·s (48,000 poise) in the conditions that the polyester is extruded from a nozzle with a load of 9.8 MPa (100 kg/cm$^2$) using a capillary rheometer equipped with a dies having an inner diameter of 1 mm and a length of 10 mm, while heated at a heating rate of 4° C./minute.

An aromatic liquid-crystalline polyester of the present invention preferably has a flow-initiating temperature in the range of from 300° C. to 400° C. from the view point of improving heat resistance. For suppressing deterioration of the polymer (polyester) by decomposition as well as improving heat resistance, the polyester more preferably has a flow-initiating temperature in the range of from 320° C. to 380° C., and most preferably has a flow-initiating temperature in the range of from 330° C. to 360° C.

The aromatic liquid-crystalline polyester as described above, can be molded into a film, thereby obtaining an aromatic liquid-crystalline polyester film in the present invention. For example, the polyester may be melted and then be formed into a film.

Examples of the aromatic liquid-crystalline polyester film formed after melting include a so-called uniaxially oriented film or biaxially oriented film, which may be obtained by melt-kneading the aromatic liquid-crystalline polyester with an extruder, extruding the molten polyester through a T-die, and winding the molten polyester while the polyester is drawn in the direction of winding direction (longitudinal direction) of a winder; an inflation film which may be obtained by forming the molten sheet of the aromatic liquid-crystalline polyester, while being extruded from a cylindrical die, into a film by the tubular method; and the like.

The optimal temperature of the extruder for forming the uniaxially oriented film varies depending on the monomer units of the aromatic liquid-crystalline polyester, and may be in the range of from 200° C. to 400° C., and is preferably in the range of from 230° C. to 380° C. It is preferred that the temperature of the cylinder is set within this range, since the heat decomposition of the aromatic liquid-crystalline polyester can be suppressed, which tends to result in forming the film, easily.

The slit clearance (opening) of T-die (when utilized) is preferably in the range of from 0.1 mm to 2 mm.

A draft ratio of the uniaxially oriented film of the present invention may be in the range of from 1.1 to 45. The draft ratio used herein can be defined as a value obtained by dividing the cross sectional area of a T-dye slit with the cross sectional area of the film in the longitudinal direction. This draft ratio range is preferable since the film strength tends to be improved when the draft ratio is not smaller than 1.1, while surface smoothness of the film tends to be excellent when the draft ratio is not larger than 45. The draft ratio can be controlled by the setting conditions of the extruder, winding speed and the like.

For forming a biaxially oriented film, the setting conditions of the extruder can be the same as in forming the uniaxially oriented film, or the setting temperature of the cylinder may be in the range of from 200° C. to 400° C., preferably about in the range of from 230° C. to 380° C., and the slit clearance of T-die for melt extrusion may be in the range of from 0.1 mm to 2 mm.

The biaxially drawing film can be obtained, for example, in a method of drawing the molten sheet of the aromatic liquid-crystalline polyester, while being extruded from T-die, simultaneously in the longitudinal direction and in the direction perpendicular to the longitudinal direction (transverse direction); in a method of drawing the molten sheet, while being extruded from T-die, in the longitudinal direction at first, followed by drawing the longitudinally extruded molten sheet in the transverse direction with a tenter at a temperature of 100° C. to 400° C. in the same production step, or a successive drawing method; and the like.

The draw ratios of the biaxially oriented film is preferably in the ranges of from 1.1 times to 20 times in the longitudinal direction and in the ranges of from 1.1 to 20 times in the transverse direction, compared with the film before being drawn. When the draw ratio is in the range as described above, the film obtained is excellent in strength, and also a film with a uniform thickness tends to be readily obtained.

The inflation film can be obtained as described below.

For example, an aromatic liquid-crystalline polyester of the present invention is supplied to a melt-kneading extruder equipped with an annular slit die, the polyester is melt-kneaded by setting-the temperature of the cylinder at 200° C. to 400° C., preferably at 230° C. to 380° C., and a cylindrical aromatic polyester film is obtained by extruding the polyester upwardly or downwardly from the annular slit of the extruder. The clearance of the annular slit may be 0.1 mm to 5 mm, preferably 0.2 mm to 2 mm, and the diameter of the annular slit may be 20 mm to 1000 mm, preferably 25 mm to 600 mm.

In the above method, the melt-extruded cylindrical film of the molten polyester resin is drawn in the longitudinal direction (MD), while air or an inert gas such as a nitrogen gas is blown from the inside of the cylindrical molten resin film so that the cylindrical molten polyester resin film is drawn by inflation in the transverse direction (TD) perpendicular to the longitudinal direction.

The blow-up ratio (that is a ratio of the tube diameter after blowing to the tube diameter before blowing for molding) may be 1.5 to 10.

The draw ratio in the longitudinal direction (MD draw ratio) may be in the range of from 1.5 to 40. This range is preferable, since an aromatic liquid-crystalline polyester film having a uniform thickens and high strength tends to be obtained without arising wrinkles.

The inflation film may be retrieved by allowing it to pass through a nip roll after cooling with air or water.

For forming the inflation film, the conditions in which a cylindrical molten film is inflated with a uniform thickness and smooth surface may be appropriately selected depending on the monomer units of the aromatic liquid-crystalline polyester film.

The thickness of the aromatic liquid-crystalline polyester film in the present invention is preferably in the range of from 0.5 $\mu$m to 500 $\mu$m from the viewpoint of film moldability and mechanical characteristics, and is more preferably in the range of from 1 $\mu$m to 100 $\mu$m from the viewpoint of handling performance.

Fillers and additives may be added to the aromatic liquid-crystalline polyester film of the present invention as long as these do not adversely affect on the film.

Examples of the filler include organic fillers such as an epoxy resin powder, a melamine resin powder, a urea resin powder, a benzoguanamine resin powder, a polyester resin powder and a styrene resin powder; and inorganic fillers such as silica, alumina, titanium oxide, zirconia, kaolin, calcium carbonate and calcium phosphate.

Examples of the additives include a coupling agent, precipitation preventive agent, a UV absorbing agent and a heat stabilizer.

An aromatic liquid-crystalline polyester film of the present invention may contain one or two or more kinds of the resins other than the polyester of the present invention, as long as the resin does not adversely affect on the film. Examples of such resins include thermoplastic resins such as polypropylene, polyamide, polyester (other than the polyester of the present invention), polyphenylene sulfide, polyetherketone, polycarbonate, polyether sulfone, polyphenylether and modified resins thereof, and polyether imide; and elastomers such as a copolymer of glycidyl methacrylate and polyethylene.

In the present invention, a laminate comprising a metal layer and a layer comprising the aromatic liquid-crystalline polyester film as mentioned above is also provided. The layer comprising the aromatic liquid-crystalline polyester film may serve as an insulating layer in the laminate. To prepare the laminate, for example, the aromatic liquid-crystalline polyester film of the present invention may be placed on (laminated with) a metal layer.

Examples of the methods for laminating the aromatic liquid-crystalline polyester film in the present invention with the metal layer include:

(1) a method of laminating the aromatic liquid-crystalline polyester film on a metal foil by thermo-compression;

(2) a method of bonding the aromatic liquid-crystalline polyester film to a metal foil with an adhesive; and (3) a method of forming the metal layer onto the aromatic liquid-crystalline polyester film by vapor deposition.

In the lamination method (1), the aromatic liquid-crystalline polyester film is press-bonded onto the metal foil using a press machine or heating roll at near the flow-initiating temperature of the aromatic liquid-crystalline polyester film. The lamination method (1) is readily applied among these methods and thus recommended.

Examples of the adhesive used in the lamination method (2) include a hot-melt adhesive and polyurethane adhesive. Among them, an epoxy group-containing ethylene copolymer is preferred.

Examples of the lamination method (3) include an ion-beam sputtering method, a high frequency sputtering method, a direct current magnetron sputtering method and a glow discharge method. Among these methods, the high frequency sputtering method is preferred.

For preparing such a laminate of the film with a metal layer, the surface of the aromatic liquid-crystalline polyester film, on which the metal layer is placed, may be subjected to corona discharge treatment, UV irradiation treatment or plasma treatment in order to enhance adhesion between the film and the metal.

Examples of the metal used for the metal layer in the present invention include gold, silver, copper, nickel and aluminum. Copper is preferred for a TAB-tape and printed circuit board, while aluminum is preferred for a capacitor.

Examples of the structure of the laminate include a dual-layer structure made of a metal layer and a layer comprising the aromatic liquid-crystalline polyester film; a triple-layer structure in which the metal layers are laminated on both surfaces of the layer comprising the aromatic liquid-crystalline polyester film; and a five-fold layer structure in which the metal layers and the layers comprising the aromatic liquid-crystalline polyester films are alternately laminated with one another.

The laminate may be heat-treated, if necessary. By such a treatment, the laminate tends to have a high strength.

In the present invention, a resin composition comprising the above-mentioned aromatic liquid-crystalline polyester is provided. The resin composition may comprise the aromatic liquid-crystalline polyester and a filler.

Examples of the filler which may be contained in the aromatic liquid-crystalline polyester resin composition include glass fibers such as milled glass fiber, chopped glass fiber; inorganic fillers such as glass beads, hollow glass sphere, glass powder, mica, talc, clay, silica, alumina, potassium titanate, wollastonite, calcium carbonate (heavy, light, gluey), magnesium carbonate, basic magnesium carbonate, sodium sulfate, calcium sulfate, barium sulfate, calcium sulfite, aluminum hydroxide, magnesium hydroxide, calcium hydroxide, calcium silicate, silica sand, silica stone, quartz titanium oxide, zinc oxide, iron oxide graphite, molybdenum, asbestos, silica alumna fiber, alumina fiber, gypsum fiber, carbon fiber, carbon black, white carbon, diatomaceous earth, bentonite, sericite, sand bar and graphite; and metallic or non-metallic whiskers such as potassium titanate whisker, alumina whisker, aluminum borate whisker, silicon carbide whisker and silicon nitride whisker. Glass fiber, glass powder, mica, talc and carbon fiber are favorably used among them. Two or more kinds of the above fillers may be utilized in the aromatic liquid-crystalline polyester resin composition in the present invention.

The amount of the filler which may be blended in the aromatic liquid-crystalline polyester resin composition may be in the range of from 0.1 to 400 parts by weight, preferably in the range of from 10 parts by weight to 400 parts by weight, and more preferably in the range of from about 10 parts by weight to 250 parts by weight, relative to 100 parts by weight of the aromatic liquid-crystalline polyester.

The filler may be subjected to surface treatment. Examples of the surface treatment method include a method comprising allowing the surface of the filler to adsorb the surface treatment agent, and a method comprising adding the surface treatment agent to a kneader when the filler is kneaded with the polyester.

Examples of the surface treatment agent include reactive coupling agents such as silane-based coupling agents, titanate-based coupling agents and borane-based coupling agents, and lubricants such as higher fatty acids, higher fatty acid esters, metal salts of higher fatty acids and fluorocarbon-based surfactants.

A molded article can be obtained by molding the aromatic liquid-crystalline polyester resin composition in the present invention. In addition to the aromatic liquid-crystalline polyester resin in the present invention and the filler as described above, the molded article in the present invention may comprise the thermoplastic resins other than the aromatic liquid-crystalline polyester resin and additives. Examples of the additives include release improving agents such as fluororesins and metal soaps, nucleation agents, antioxidants, stabilizers, plasticizers, sliding agents, color preventive agents, coloring agents, UV absorbing agents, antistatic agents, lubricants and fire retardants.

Examples of the thermoplastic resin other than the aromatic liquid-crystalline polyester resin include polycarbonate resins, polyamide resins, polysulfone resins, polyphenylene sulfide resins, polyphenylene ether resins, polyether ketone resins and polyether imide resins.

Examples of the method for producing the molded article in the present invention include:

a method of adding and mixing starting materials (such as an aromatic liquid-crystalline polyester of the present invention, filler and additives) in a kneading machine (such as single axis extruder, dual axis kneader, Bumbury mixer, roll, blavendor and kneader), melt-kneading the resulting mixture to prepare an aromatic liquid-crystalline polyester resin composition, and molding the composition by supplying it in a molding machine (such as a extrusion molding machine, injection molding machine, compression molding machine and blow molding machine);

a method of pre-mixing the starting materials using a mortar, Henshel mixer, ball mill or ribbon blender, adding the pre-mixed material to a kneader, melt-kneading the material and molding the kneaded material as described above; and a method of supplying the starting materials to a molding machine, and molding the materials while melt-kneading.

Among them, the method comprising an injection molding is preferred since the polyester can show a good melt-moldability and the resulting molded article has a good heat resistance.

The invention being thus described, it will be apparent that the same may be varied in many ways. Such variations are to be regarded as within the spirit and scope of the invention, and all such modifications as would be apparent to one skilled in the art are intended to be within the scope of the following claims.

The entire disclosure of the Japanese Patent Application No. 2003-375295 filed on Nov. 5, 2003 and the Japanese Patent Application No. 2004-053330 filed on Feb. 27, 2004, both including specification, claims and summary, are incorporated herein by reference in their entirety.

EXAMPLE

The present invention is described in more detail by following Examples, which should not be construed as a limitation upon the scope of the present invention.

In Examples and Comparative Examples, flow-initiating temperature was measured as described below:

About 2 g of the sample is filled in a capillary rheometer equipped with a dies with an inner diameter of 1 mm and a length of 10 mm using a flow tester (trade name CFT-500, manufactured by Shimadzu Corp.). The aromatic liquid-crystalline polyester is extruded from a nozzle at a heating rate of 4° C./minute under a load of 9.8 MPa (100 kg/cm$^2$), and the temperature when the melt viscosity becomes 4,800 Pa·s (48,000 poise) is defined to be the flow-initiating temperature.

Example 1

2-hydroxy-6-naphthoic acid (940.9 g, 5.0 mol), 4,4'-dihydroxybiphenyl (512.08 g, 2.75 mol, in which excess amount of 0.25 mole was included), 2,6-naphthalene dicarboxylic acid (497.24 g, 2.3 mol), terephthalic acid (33.23 g, 0.2 mol), acetic anhydride (1179.14 g, 11.5 mol) and 1-methyl imidazole (0.198 g) as a catalyst were added into a reactor equipped with a stirrer, torque meter, nitrogen gas introduction tube, thermometer and reflux condenser. After stirring at room temperature for 15 minutes, the reactor was heated with stirring. When the inner temperature of the reactor reached 145° C., 1-methyl imidazole (5.94 g) was further added while the temperature is kept at the same temperature with stirring for additional 1 hour.

Then, the temperature was increased from 145° C. to 310° C. in 3 hours and 30 minutes while acetic acid as a by-product and unreacted acetic anhydride were removed by distillation. An aromatic polyester prepolymer was obtained by keeping the temperature for 2 hours and 10 minutes. The aromatic polyester prepolymer was cooled to room temperature, and was pulverized with a pulverizer to obtain a powder of the aromatic polyester prepolymer (particle diameter; about 0.1 to 1 mm.).

The flow-initiating temperature of the powder (aromatic liquid-crystalline polyester) was measured to be 273° C. with a flow tester.

The powder obtained was heated from 25° C. to 250° C. in 1 hour, and from 250° C. to 325° C. in 10 hours, followed by keeping at the temperature 12 hours for solid phase polymerization. The powder after the solid phase polymerization was then cooled, and the flow-initiating temperature of the powder (aromatic liquid-crystalline polyester) after cooling was measured to be 335° C. with a flow tester.

Example 2

2-hydroxy-6-naphthoic acid (940.9 g, 5.0 mol), hydroquinone (302.80 g, 2.75 mol, in which excess amount of 0.25 mole was included), 2,6-naphthalene dicarboxylic acid (497.24 g, 2.3 mol), terephthalic acid (33.23 g, 0.2 mol), acetic anhydride (1232.74 g, 12.08 mol) and 1-methyl imidazole (0.17 g) as a catalyst were added into a reactor as used in Example 1. After stirring at room temperature for 15 minutes, the reactor was heated with stirring. After the inner temperature of the reactor reached 145° C., the temperature is kept at the same temperature with stirring for additional 1 hour.

Then, the temperature was increased from 145° C. to 310° C. in 3 hours and 30 minutes while acetic acid as a by-product and unreacted acetic anhydride were removed by distillation. An aromatic polyester prepolymer was obtained by keeping the temperature for 2 hours. The aromatic polyester prepolymer was cooled to room temperature, and was pulverized with a pulverizer to obtain a powder of the aromatic polyester prepolymer (particle diameter; about 0.1 to 1 mm.).

The flow-initiating temperature of the powder (aromatic liquid-crystalline polyester) was measured to be 277° C. with a flow tester.

The powder obtained was heated from 25° C. to 250° C. in 1 hour, and from 250° C. to 315° C. in 5 hours, followed by keeping at the temperature 3 hours for solid phase polymerization. The powder after the solid phase polymerization was then cooled, and the flow-initiating temperature of the powder (aromatic liquid-crystalline polyester) after cooling was measured to be 326° C. with a flow tester.

Example 3

2-hydroxy-6-naphthoic acid (940.9 g, 5.0 mol), hydroquinone (302.80 g, 2.75 mol, in which excess amount of 0.25 mole was included) 2,6-naphthalene dicarboxylic acid (432.38 g, 2.0 mol), terephthalic acid (83.07 g, 0.5 mol), acetic anhydride (1232.74 g, 12.08 mol) and 1-methyl imidazole (0.17 g) as a catalyst were added into a reactor as used in Example 1. After stirring at room temperature for 15 minutes, the reactor was heated with stirring. After the inner temperature of the reactor reached 145° C., the temperature is kept at the same temperature with stirring for additional 1 hour.

Then, the temperature was increased from 145° C. to 310° C. in 3 hours and 30 minutes while acetic acid as a by-product and unreacted acetic anhydride were removed by distillation. An aromatic polyester prepolymer was obtained by keeping the temperature for 2 hours and 15 minutes. The aromatic polyester prepolymer was cooled to room temperature, and was pulverized with a pulverizer to obtain a powder of the aromatic polyester prepolymer (particle diameter; about 0.1 to 1 mm.).

The flow-initiating temperature of the powder (aromatic liquid-crystalline polyester) was measured to be 264° C. with a flow tester.

The powder obtained was heated from 25° C. to 250° C. in 1 hour, and from 250° C. to 315° C. in 5 hours, followed by keeping at the temperature 5 hours for solid phase polymerization. The powder after the solid phase polymerization was then cooled, and the flow-initiating temperature of the powder (aromatic liquid-crystalline polyester) after cooling was measured to be 338° C. with a flow tester.

Example 4

2-hydroxy-6-naphthoic acid (1034.99 g, 5.5 mol), hydroquinone (272.52 g, 2.475 mol, in which excess amount of 0.225 mole was included), 2,6-naphthalene dicarboxylic acid (443.19 g, 2.05 mol), terephthalic acid (33.23 g, 0.2 mol), acetic anhydride (1226.87 g, 12.1 mol) and 1-methyl imidazole (0.17 g) as a catalyst were added into a reactor as used in Example 1. After stirring at room temperature for 15 minutes, the reactor was heated with stirring. After the inner temperature of the reactor reached 145° C., the temperature is kept at the same temperature with stirring for additional 1 hour.

Then, the temperature was increased from 145° C. to 310° C. in 3 hours and 30 minutes while acetic acid as a by-product and unreacted acetic anhydride were removed by distillation. An aromatic polyester prepolymer was obtained by keeping the temperature for 3 hours. The aromatic polyester prepolymer was cooled to room temperature, and was pulverized with a pulverizer to obtain a powder of the aromatic polyester prepolymer (particle diameter; about 0.1 to 1 mm.).

The flow-initiating temperature of the powder (aromatic liquid-crystalline polyester) was measured to be 282° C. with a flow tester.

The powder obtained was heated from 25° C. to 250° C. in 1 hour, and from 250° C. to 315° C. in 5 hours, followed by keeping at the temperature 3 hours for solid phase polymerization. The powder after the solid phase polymerization was then cooled, and the flow-initiating temperature of the powder (aromatic liquid-crystalline polyester) after cooling was measured to be 349° C. with a flow tester.

Example 5

2-hydroxy-6-naphthoic acid (1034.99 g, 5.5 mol), hydroquinone (272.52 g, 2.475 mol, in which excess amount of 0.225 mole was included), 2,6-naphthalene dicarboxylic acid (378.33 g, 1.75 mol), terephthalic acid (83.07 g, 0.5 mol), acetic anhydride (1226.87 g, 12.1 mol) and 1-methyl imidazole (0.17 g) as a catalyst were added into a reactor as used in Example 1. After stirring at room temperature for 15 minutes, the reactor was heated with stirring. After the inner temperature of the reactor reached 145° C., the temperature is kept at the same temperature with stirring for additional 1 hour.

Then, the temperature was increased from 145° C. to 310° C. in 3 hours and 30 minutes while acetic acid as a by-product and unreacted acetic anhydride were removed by distillation. An aromatic polyester prepolymer was obtained by keeping the temperature for 3 hours. The aromatic polyester prepolymer was cooled to room temperature, and was pulverized with a pulverizer to obtain a powder of the aromatic polyester prepolymer (particle diameter; about 0.1 to 1 mm.).

The flow-initiating temperature of the powder (aromatic liquid-crystalline polyester) was measured to be 261° C. with a flow tester.

The powder obtained was heated from 25° C. to 250° C. in 1 hour, and from 250° C. to 315° C. in 5 hours, followed by keeping at the temperature 3 hours for solid phase polymerization. The powder after the solid phase polymerization was then cooled, and the flow-initiating temperature of the powder (aromatic liquid-crystalline polyester) after cooling was measured to be 330° C. with a flow tester.

Example 6

2-hydroxy-6-naphthoic acid (1129.08 g, 6.0 mol), hydroquinone (242.24 g, 2.2 mol, in which excess amount of 0.2 mole was included), 2,6-naphthalene dicarboxylic acid (389.14 g, 1.8 mol), terephthalic acid (33.23 g, 0.2 mol), acetic anhydride (1221.00 g, 11.96 mol) and 1-methyl imidazole (0.17 g) as a catalyst were added into a reactor as used in Example 1. After stirring at room temperature for 15 minutes, the reactor was heated with stirring. After the inner temperature of the reactor reached 145° C., the temperature is kept at the same temperature with stirring for additional 1 hour.

Then, the temperature was increased from 145° C. to 310° C. in 3 hours and 30 minutes while acetic acid as a by-product and unreacted acetic anhydride were removed by distillation. An aromatic polyester prepolymer was obtained by keeping the temperature for 3 hours. The aromatic polyester prepolymer was cooled to room temperature, and was pulverized with a pulverizer to obtain a powder of the aromatic polyester prepolymer (particle diameter; about 0.1 to 1 mm.).

The flow-initiating temperature of the powder (aromatic liquid-crystalline polyester) was measured to be 272° C. with a flow tester.

The powder obtained was heated from 25° C. to 250° C. in 1 hour, and from 250° C. to 315° C. in 5 hours, followed by keeping at the temperature 3 hours for solid phase polymerization. The powder after the solid phase polymerization was then cooled, and the flow-initiating temperature of the powder (aromatic liquid-crystalline polyester) after cooling was measured to be 347° C. with a flow tester.

Example 7

2-hydroxy-6-naphthoic acid (1129.08 g, 6.0 mol), hydroquinone (242.24 g, 2.2 mol, in which excess amount of 0.2 mole was included), 2,6-naphthalene dicarboxylic acid (324.29 g, 1.5 mol), terephthalic acid (83.07g, 0.5 mol), acetic anhydride (1221.00 g, 11.96 mol) and 1-methyl imidazole (0.17 g) as a catalyst were added into a reactor as used in Example 1. After stirring at room temperature for 15 minutes, the reactor was heated with stirring. After the inner temperature of the reactor reached 145° C., the temperature is kept at the same temperature with stirring for additional 1 hour.

Then, the temperature was increased from 145° C. to 310° C. in 3 hours and 30 minutes while acetic acid as a by-product and unreacted acetic anhydride were removed by distillation. An aromatic polyester prepolymer was obtained by keeping the temperature for 1 hour and 15 minutes. The aromatic polyester prepolymer was cooled to room temperature, and was pulverized with a pulverizer to obtain a powder of the aromatic polyester prepolymer (particle diameter; about 0.1 to 1 mm.).

The flow-initiating temperature of the powder (aromatic liquid-crystalline polyester) was measured to be 263° C. with a flow tester.

The powder obtained was heated from 25° C. to 250° C. in 1 hour, and from 250° C. to 315° C. in 5 hours, followed by keeping at the temperature 3 hours for solid phase polymerization. The powder after the solid phase polymerization was then cooled, and the flow-initiating temperature of the powder (aromatic liquid-crystalline polyester) after cooling was measured to be 334° C. with a flow tester.

Comparative Example 1 p-hydroxybenzoic acid (911 g, 6.6 mol), 4,4-dihydroxybiphenyl (409 g, 2.2 mol), terephthalic acid (274 g, 1.65 mol), isophthalic acid (91 g, 0.55 mol) and acetic anhydride (1,235 g, 12.1 mol) were added to a reactor as used in Example 1. After stirring the mixture for 15 minutes at room temperature, the temperature was increased with stirring. Stirring was continued for additional 1 hour after the inner temperature had reached 145° C.

The temperature was increased to 305° C. thereafter in 3 hours and 30 minutes while acetic acid as a by-product and unreacted acetic anhydride were removed by distillation. An aromatic polyester prepolymer was obtained by keeping the temperature for 1 hour. The aromatic polyester prepolymer was cooled to room temperature, and was pulverized with a pulverizer to obtain a powder of the aromatic polyester prepolymer (particle diameter; about 0.1 to 1 mm). The flow-initiating temperature of the powder (aromatic liquid-crystalline polyester) was measured to be 255° C. using a flow tester.

The powder obtained was heated from 25° C. to 250° C. in 1 hour, followed by heating from 250° C. to 290° C. in 5 hours. The temperature was kept for 3 hours for solid phase polymerization. The powder after the solid phase polymerization was cooled, and the flow-initiating temperature of the powder (aromatic liquid-crystalline polyester) after cooling was measured to be 336° C. with a flow tester.

Comparative Example 2

2-hydroxy-6-naphtonic acid (987.95 g, 5.25 mol), 4,4'-dihydroxybiphenyl (486.47 g, 2.612 mol, in which excess amount of 0.237 mole was included), 2,6-naphthalene dicarboxylic acid (513.45 g, 2.375 mol), acetic anhydride (1174.0 g, 11.5 mol) and 1-methylimidazole (0.194 g) as a catalyst were added in a reactor as used in Example 1. The mixture was stirred at room temperature for 15 minutes, followed by increasing the temperature with stirring. Stirring was continued for additional 1 hour while the same temperature was kept after the inner temperature had reached 145° C., and 1-methylimidazole (5.83 g) as a catalyst was further added.

The temperature was increased from 145° C. to 310° C. in 3 hours and 30 minutes while acetic acid as a by-product and unreacted acetic anhydride were removed by distillation. Am aromatic polyester prepolymer was obtained by keeping the temperature for 2 hours. The aromatic polyester prepolymer was cooled to room temperature, and was pulverized with a pulverizer to obtain a powder of the aromatic polyester prepolymer (particle diameter; about 0.1 to 1 mm).

The flow-initiating temperature of the powder (aromatic liquid-crystalline polyester) was measured to be 273° C. with a flow tester.

The powder obtained was heated from 25° C. to 250° C. in 1 hour, heated from 250° C. to 325° C. in 10 hours, and was kept at the temperature for 12 hours for solid phase polymerization. The powder after the solid phase polymerization was cooled, and the flow-initiating temperature of the powder (aromatic liquid-crystalline polyester) after cooling was measured to be 349° C. with a flow tester.

Comparative Example 3

2-hydroxy-6-naphthoic acid (1034.99 g, 5.5 mol), 4,4'-dihydroxybiphenyl (460.87 g, 2.475 mol, in which excess amount of 0.225 mole was included), 2,6-naphthalene dicarboxylic acid (486.43 g, 2.25 mol), acetic anhydride (1174.04 g, 11.5 mol) and 1-methylimidazole (0.914 g) as a catalyst were added to a reactor as in Example 1. After stirring the mixture at room temperature for 15 minutes, the temperature was increased with stirring. When the inner temperature reached 145° C., 1-methylimidazole (5.28 g) as a catalyst was further added while the temperature was maintained with stirring for 1 hour.

Then, the temperature was increased from 145° C. to 310° C. in 3 hours and 30 minutes while removing acetic as a by-product and unreacted acetic anhydrides distilled. The temperature was kept for 2 hours to obtain an aromatic polyester prepolymer. The aromatic polyester prepolymer was cooled to room temperature, pulverized with a pulverizer to obtain a powder of the aromatic polyester prepolymer (particle diameter; about 0.1 to 1 mm).

The flow-initiating temperature of the powder (aromatic liquid-crystalline polyester) was measured to be 273° C. with a flow tester.

The powder obtained was heated from 25° C. to 250° C. in 1 hour, and then from 250° C. to 325° C. in 10 hours, followed by keeping the temperature for 12 hours for solid phase polymerization. The powder after the solid phase polymerization was cooled, and the flow-initiating temperature of the powder (aromatic liquid-crystalline polyester) after cooling was measured to be 352° C. with a flow tester.

Each of the powders of the aromatic liquid-crystalline polyester obtained by solid phase polymerization in Examples 1 to 7 and Comparative Examples 1 to 3 was melted in a uniaxial extruder (screw diameter 50 mm), and the molten polymer was extruded from a T-die (lip length 300 mm, lip clearance 1 mm, die temperature 360° C.) at the tip of the extruder as a film with a draft ratio of 4. The extruded film was cooled to obtain a film of the aromatic liquid-crystalline polyester with a thickness of 250 μm. The resin was evaluated as "○" when the tension of the molten resin in the film forming process was excellent to enable a continuous film to be obtained, and the resin was evaluated as "Δ" when the tension of the molten resin in the film forming process was poor to unable a continuous film to be obtained, although the film was obtained.

Dielectric constant and dielectric loss of each film obtained was measured with an impedance material analyzer manufactured by Hewlett-Packard Co.

Anti-foaming property (blister) of each film obtained was measured by immersing the film in H60A solder (tin 60%, lead 40%) at 280° C. for 120 seconds. The result was evaluated as sign "○" when no foaming was observed, and as sign "Δ" when foaming was observed.

The results and conditions in Examples 1 to 7 and Comparative Examples 1 to 3 are summarized in Tables 1 to 3.

TABLE 1

| Components | Example | | | | | | | Comparative Example | | |
|---|---|---|---|---|---|---|---|---|---|---|
| | 1 | 2 | 3 | 4 | 5 | 6 | 7 | 1 | 2 | 3 |
| p-Hydroxybenzoic acid (% by mole) | None | None | None | None | None | None | None | 60 | None | None |
| 2-Hydroxy-6-naphthoic acid (% by mole) | 50 | 50 | 50 | 55 | 55 | 60 | 60 | None | 52.5 | 55 |
| 4,4'-Dihydroxybiphenyl (% by mole) | 25 | None | None | None | None | None | None | 20 | 23.75 | 22.5 |
| Hydroquinone (% by mole) | None | 25 | 25 | 22.5 | 22.5 | 20 | 20 | None | None | None |
| 2,6-Naphthalene dicarboxylic acid (% by mole) | 23 | 23 | 20 | 20.5 | 17.5 | 18 | 15 | None | 23.75 | 22.5 |
| Terephthalic acid (% by mole) | 2 | 2 | 5 | 2 | 5 | 2 | 5 | 15 | None | None |
| Isophthalic acid (% by mole) | None | None | None | None | None | None | None | 5 | None | None |
| Amount of 1-methylimidazole (based on the total amount of monomers; ppm) | 3100 | 100 | 100 | 100 | 100 | 100 | 100 | None | 3100 | 3100 |

TABLE 2

| Production Conditions | Example | | | | | | | Comparative Example | | |
|---|---|---|---|---|---|---|---|---|---|---|
| | 1 | 2 | 3 | 4 | 5 | 6 | 7 | 1 | 2 | 3 |
| Production Condition of Pre-Polymer | | | | | | | | | | |
| Max. of Polymerization Temp. (° C.) | 310 | 310 | 310 | 310 | 310 | 310 | 310 | 305 | 310 | 310 |
| Discharge Performance of Pre-Polymer | possible | possible | possible | possible | possible | possible | possible | possible | possible | possible |
| Characteristics of Pre-Polymer | | | | | | | | | | |
| Flow-initiating Temp. (° C.) | 273 | 277 | 264 | 282 | 261 | 272 | 263 | 255 | 273 | 273 |
| Particle Diameter (mm) | 0.1–1.0 | 0.1–1.0 | 0.1–1.0 | 0.1–1.0 | 0.1–1.0 | 0.1–1.0 | 0.1–1.0 | 0.1–1.0 | 0.1–1.0 | 0.1–1.0 |
| Solid Phase Polymerization Condition | | | | | | | | | | |
| Solid Phase Polymerization Temp. (° C.) | 325 | 315 | 315 | 315 | 315 | 315 | 315 | 290 | 325 | 325 |
| Time Period of Solid Phase Polymerization Temp. (hours) | 12 | 3 | 5 | 3 | 3 | 3 | 3 | 5 | 12 | 12 |

TABLE 3

| | Characteristics of Films | | | | | | | | | |
|---|---|---|---|---|---|---|---|---|---|---|
| | Example | | | | | | | Comparative Example | | |
| | 1 | 2 | 3 | 4 | 5 | 6 | 7 | 1 | 2 | 3 |
| Characteristics of Aromatic Liquid-crystalline Polyester Films | | | | | | | | | | |
| Flow-initiating Temp. (° C.) | 335 | 326 | 338 | 349 | 330 | 347 | 334 | 336 | 349 | 352 |
| Solder Heat Resistance (280° C., 60 S⁻¹) | ○ | ○ | ○ | ○ | ○ | ○ | ○ | ○ | ○ | ○ |
| (100 MHz) | 3.3 | 3.0 | 3.0 | 3.0 | 3.1 | 3.0 | 3.1 | 3.0 | 3.2 | 3.2 |
| (1 GHz) | 0.8 | 0.9 | 0.4 | 0.9 | 0.8 | 0.9 | 0.8 | 3.7 | 0.7 | 0.4 |
| Film Moldability (Tension) | ○ | ○ | ○ | ○ | ○ | ○ | ○ | ○ | Δ | Δ |

As described above, since the aromatic liquid-crystalline polyester of the invention has small dielectric loss and is excellent in film moldability, the film of the aromatic liquid-crystalline polyester obtained by melt-molding of the aromatic liquid-crystalline polyester can be favorably used for substrate materials of electronic substrates such as flexible printed circuit board, rigid printed circuit boards and module substrates, interlayer insulating materials and surface protective films. The laminate of a metal layer and an insulating layer comprising the aromatic liquid-crystalline polyester film in the present invention can be used for capacitors and electronic wave shield materials.

What is claimed is:

1. An aromatic liquid-crystalline polyester comprising repeating units represented by the following formulae (I), (II), (III) and (IV):

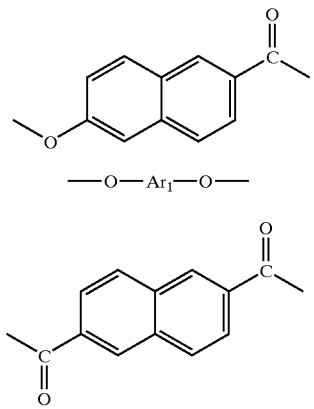

$$-O-Ar_1-O- \quad (II)$$

$$-\overset{O}{\underset{\|}{C}}-Ar_2-\overset{O}{\underset{\|}{C}}- \quad (IV)$$

Ar₁ and Ar₂ independently representing 1,4-phenylene or 4,4'-biphenylene, and
 the amount of repeating unit (I) being in the range of from 40% by mole to 74.8% by mole;
 the amount of repeating unit (II) being in the range of from 12.5% by mole to 30% by mole;
 the amount of repeating unit (III) being in the range of from 12.5% by mole to 30% by mole; and
 the amount of repeating unit (IV) being in the range of from 0.2% by mole to 15% by mole,
each molecular amount ratio being relative to the sum of the molecular amounts of repeating units (I) to (IV), wherein the molecular amounts of repeating units (III) and (IV) satisfy the relation of (III)/[(III)+(IV)]≧0.5.

2. The aromatic liquid-crystalline polyester according to claim 1, the polyester having a flow-initiating temperature in the range of 300° C. to 400° C.

3. An aromatic liquid-crystalline polyester film obtained by melt-molding the aromatic liquid-crystalline polyester according to claim 1 or 2.

4. A laminate comprising a metal layer and a layer comprising the aromatic liquid-crystalline polyester film according to claim 3.

5. An aromatic liquid-crystalline polyester resin composition comprising 100 parts by weight of the aromatic liquid-crystalline polyester according to claim 1 or 2, and a filler in the amount of from 0.1 part by weight to 400 parts by weight.

6. A molded article obtained by molding a composition comprising the aromatic liquid-crystalline polyester according to claim 1.

* * * * *